United States Patent
Iio

(10) Patent No.: US 7,033,689 B2
(45) Date of Patent: Apr. 25, 2006

(54) FUEL CELL SYSTEM

(75) Inventor: Masatoshi Iio, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 560 days.

(21) Appl. No.: 10/182,898

(22) PCT Filed: Mar. 15, 2002

(86) PCT No.: PCT/JP02/02489

§ 371 (c)(1),
(2), (4) Date: Aug. 2, 2002

(87) PCT Pub. No.: WO02/075907

PCT Pub. Date: Sep. 26, 2002

(65) Prior Publication Data

US 2003/0138687 A1    Jul. 24, 2003

(30) Foreign Application Priority Data

Mar. 21, 2001   (JP) .............................. 2001-080122

(51) Int. Cl.
*H01M 8/04*   (2006.01)
(52) U.S. Cl. ............................. 429/25; 429/19; 429/20; 429/26; 429/34; 429/38; 429/39

(58) Field of Classification Search ................. 429/19, 429/20, 25, 26, 34, 38, 39
See application file for complete search history.

(56) References Cited

U.S. PATENT DOCUMENTS

| 6,630,260 B1 * | 10/2003 | Forte et al. ................... 429/19 |
| 2001/0010875 A1 | 8/2001 | Katagiri et al. |
| 2001/0021468 A1 * | 9/2001 | Kanai et al. .................. 429/12 |

FOREIGN PATENT DOCUMENTS

| CA | 2242176 | 12/1998 |
| JP | 2000-156236 | 6/2000 |
| JP | 2001-216985 A | 8/2001 |
| WO | WO 99/67829 A2 | 12/1999 |
| WO | WO 00/63990 A2 | 10/2000 |
| WO | WO 01/20701 A1 | 3/2001 |

* cited by examiner

*Primary Examiner*—Bruce F. Bell
(74) *Attorney, Agent, or Firm*—Foley & Lardner LLP

(57) ABSTRACT

The fuel cell system according to this invention disposes a moisture exchanger (30) at a suction side of an air supply device (7). This causes an increase in the pressure differential and temperature differential of the fresh air and the cathode exhaust in the moisture exchanger (30) and promotes transfer of moisture. Since the moisture exchanger (30) effectively transfers moisture, it is possible to downsize the radiator for the cooling water and the condenser (60). Thus it is possible to reduce the weight and size of the fuel cell system.

8 Claims, 12 Drawing Sheets

FUEL CELL SYSTEM

FIELD OF THE INVENTION

This invention relates to a fuel cell system.

BACKGROUND OF THE INVENTION

Tokkai 2000-156236 published by the Japanese Patent Office in 2000 discloses a polymer electrolyte fuel cell (PEFC) system that comprises a moisture-exchanged heat exchanger to transfer moisture to fresh air from cathode exhaust.

SUMMARY OF THE INVENTION

In this fuel cell system, pressurized air enters the moisture-exchanged heat exchanger placed downstream of an air supply device. On the other hand, cathode exhaust whose pressure is lowered by a pressure loss in the fuel cell stack enters the moisture-exchanged heat exchanger. Thus, the moisture is not efficiently transferred to fresh air from cathode exhaust since the pressure difference between fresh air and cathode exhaust is small.

The purpose of this invention is to provide a fuel cell system that efficiently transfers moisture to fresh air from exhaust air.

To achieve the object above, this invention provides a fuel cell system for a vehicle.

The fuel cell system comprises a fuel cell that produces electricity by producing the reaction between air and hydrogen rich gas, an air supply device that supplies compressed air to the fuel cell, and a moisture exchanger that extracts the moisture from cathode exhaust discharged by the fuel cell and supplies moisture to the air before compressed.

The details as well as other features and advantages of this invention are set forth in the remainder of the specification and are shown in the accompanying drawings.

DESCRIPTION OF THE PREFERRED EMBODIMENTS

Figure 1:
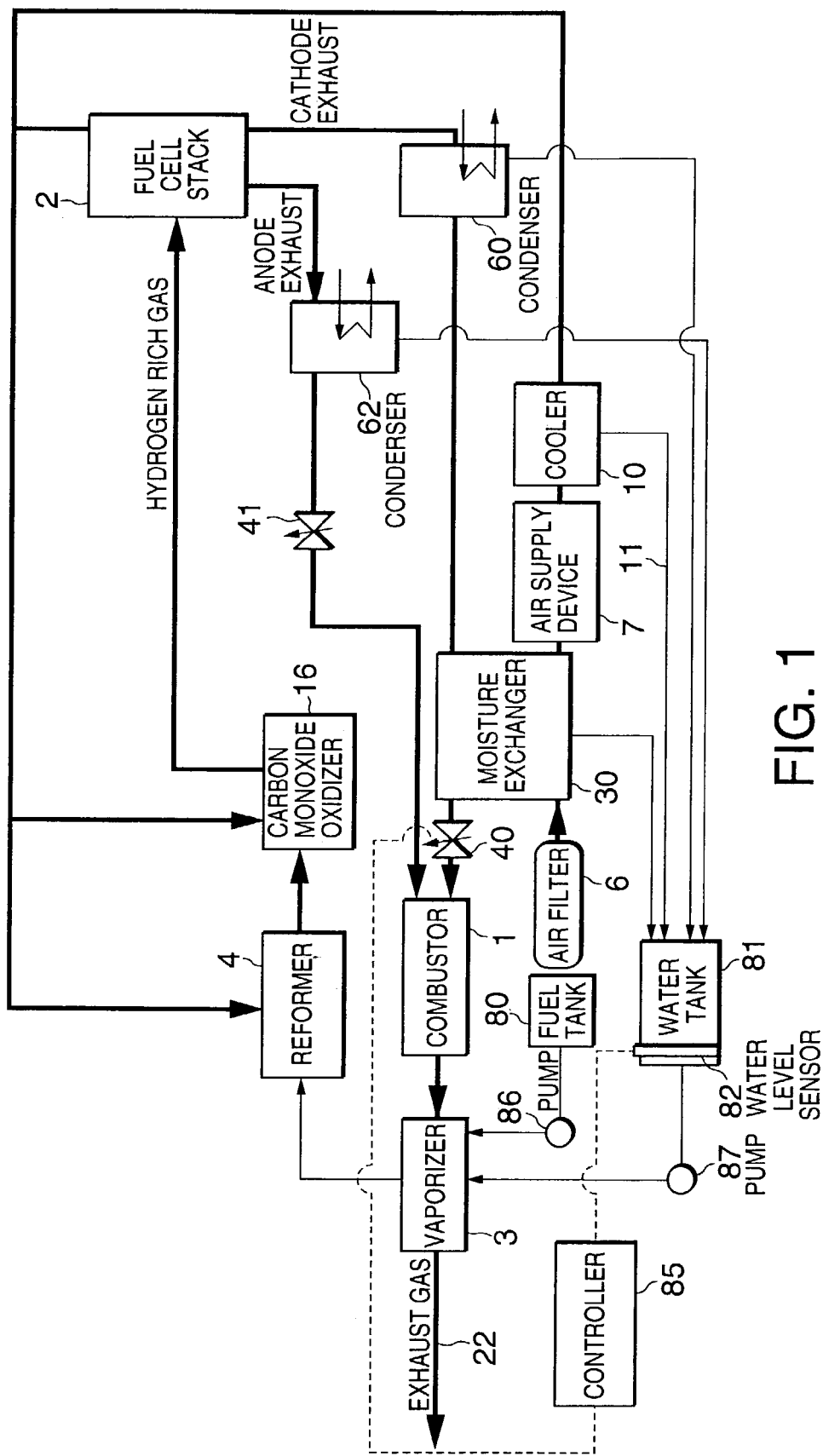
FIG. 1 is a schematic diagram of a fuel cell system according to this invention.

Referring to FIG. 1 of the drawings, a fuel cell system for a vehicle comprises an air filter 6, an air supply device 7, a cooler 10, a fuel cell stack 2, a moisture exchanger 30, and a condenser 60.

The air filter 6 cleans fresh air sucked by the air supply device 7. The moisture exchanger 30 is placed between the air filter 6 and the air supply device 7. To humidify the fresh air sucked by the air supply device 7, the moisture exchanger 30 transfers moisture to fresh air from cathode exhaust. Comprising a fan or a compressor, the air supply device 7 compresses the fresh air to an operating pressure of the fuel cell stack 2 and supplies the compressed fresh air to a cathode electrode of the fuel cell stack 2 through a cooler 10. The cooler 10 cools the fresh air to a operating temperature of the fuel cell stack 2. Condensed water in the cooler 10 is collected by a water tank 81 through a piping 11.

The fuel cell stack 2 produces electricity by making oxygen in the fresh air supplied to the cathode electrode reacts with hydrogen in hydrogen rich gas supplied to an anode electrode.

The fuel cell stack 2 produces a large amount of water vapor as a product of hydrogen and oxygen reaction. As a part of the cathode exhaust produced at the cathode electrode, this water vapor is discharged to a condenser 60. The water tank 81 collects condensed water from the cathode exhaust cooled in the condenser 60. The cathode exhaust passed through the condenser 60 still contains moisture and gives the moisture to the fresh air in the moisture exchanger 30. After removed the moisture, the dry cathode exhaust enters the combustor 1.

The moisture exchanger 30 is placed on the suction side of the air supply device 7. The pressure of fresh air in the moisture exchanger 30 is approximately equal to the suction pressure of the fan or the compressor of the air supply device 7. The temperature of the air entering the moisture exchanger 30 is approximately equal to the atmospheric temperature. Thus, the pressure differences and the temperature differences between the fresh air and the cathode exhaust suitable for the moisture transfer are realized.

This fuel cell system also comprises a reformer 4, a carbon monoxide oxidizer 16, a condenser 62, a valve 41, a combustor 1, a vaporizer 3, a pump 86, and a pump 87.

As a result of electricity generation, an anode exhaust is produced at the anode electrode. The combustor 1 combusts the mixture of the anode exhaust and the cathode exhaust and supplies the combustion gas to the vaporizer 3.

The pump 86 sends fuel to the combustor 3 from a fuel tank 80. The pump 87 sends water to the combustor 3 from the water tank 81.

The vaporizer 3 vaporizes the fuel and water with the heat of the combustion gas. After heating the fuel and water, the combustion gas is discharged into the atmosphere.

The reformer 4 generates reformate gas by generating a reaction between the vaporized fuel and steam by catalysis. The carbon monoxide oxidizer 16 removes carbon monoxide from the reformate gas to produce hydrogen rich gas and supplies the hydrogen rich gas to the fuel cell stack 2.

In the fuel cell stack 2, the hydrogen rich gas reacts with the fresh air to generate electricity. The condenser 62 cools the anode exhaust discharged from the fuel cell stack 2 to remove moisture from the anode exhaust. After removed moisture, the anode exhaust is supplied to the combustor 1 through a valve 41.

The water tank 81 stores water collected by the condenser 60, the condenser 62, and the cooler 10. The water tank 81 also stores surplus water collected by the moisture exchanger 30.

To control the amount of transferred moisture in the moisture exchanger 30, the fuel cell system comprises a controller 85. The controller 85 comprises a microcomputer having a central processing unit (CPU), a random access memory (RAM), a read-only memory (ROM), and an input/output interface (I/O interface).

To control the amount of transferred moisture in the moisture exchanger 30, a water level sensor 82 that detects a water level of the water tank 81 is connected to the controller 85. The controller 85 also controls the valve 40 to regulate the pressure of cathode exhaust.

The water level sensor 82 detects the water level of the water tank 81 and transmits it to the controller 85. The controller 85 observes the water level and controls the amount of transferred moisture in the moisture exchanger 30. To perform the above control, the controller 85 regulates the pressure of cathode exhaust by opening or closing the valve 40.

Referring to FIG. 2 to FIG. 5, the structures of the moisture exchangers 30 are described.

Figure 2:
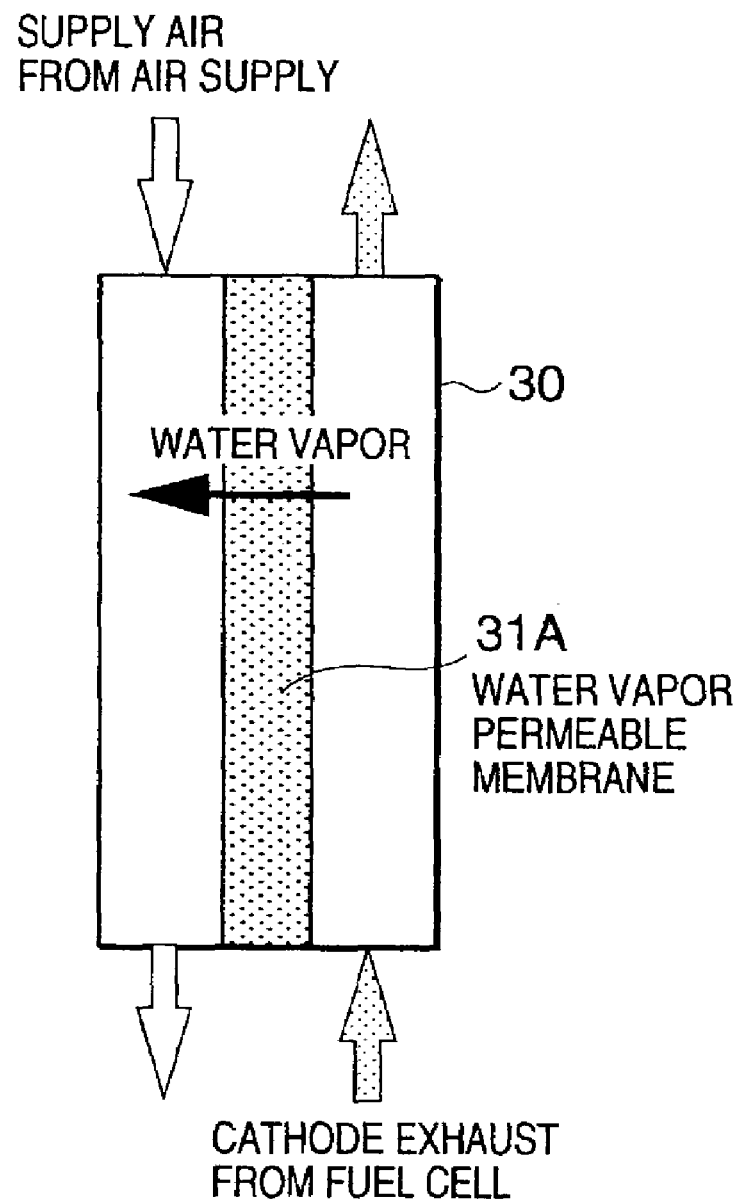
FIG. 2 is a schematic diagram of a moisture exchanger comprising a water permeable membrane.

The moisture exchanger 30 shown in FIG. 2 comprises a water vapor permeable membrane 31A that separates the fresh air and the cathode exhaust. Water vapor in the cathode exhaust moves to the fresh air since the water vapor permeable membrane only allows water vapor to move through it. As mentioned before, the pressure difference between the cathode exhaust and the fresh air in the moisture exchanger 30 is large in the fuel cell system according to this invention. Furthermore, the partial pressure of water vapor of the cathode exhaust is higher than that of the fresh air since the cathode exhaust contains much more moisture than the fresh air. Consequently, an effective transfer of water vapor to the fresh air from the cathode exhaust is realized.

Figure 3:
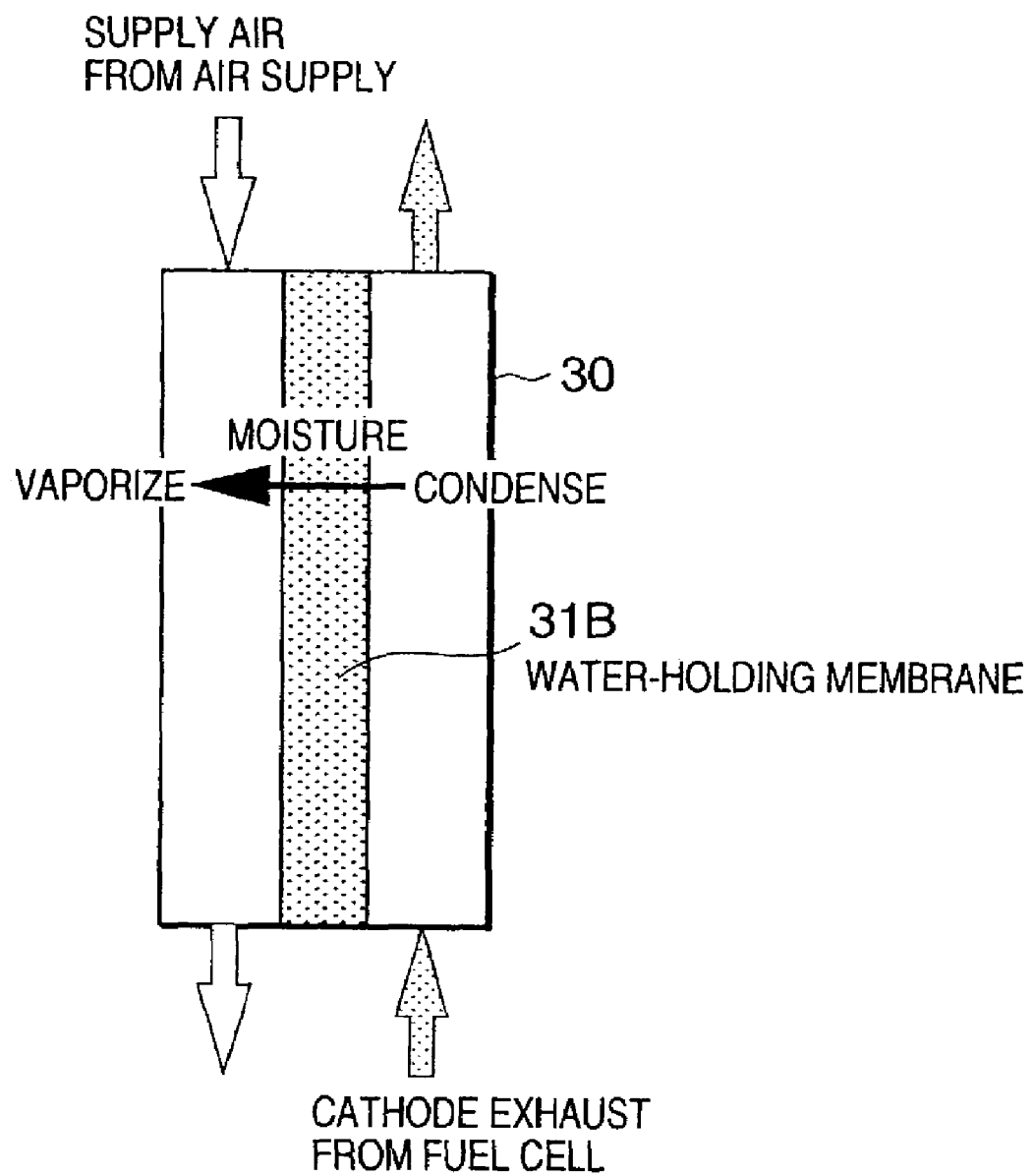
FIG. 3 is a schematic diagram of a moisture exchanger comprising a water-holding membrane.

The moisture exchanger 30 shown in FIG. 3 comprises a water-holding membrane 31B that separates the fresh air and the cathode exhaust. Since the fresh air cools the cathode exhaust in the moisture exchanger 30, moisture in cathode exhaust is condensed on the surface of the water-holding membrane 31B in the cathode exhaust side. The water-holding membrane 31B absorbs condensed water and retains a certain amount of moisture. In contrast, on the fresh air side, retained moisture in the water-holding membrane 31B vaporizes into the fresh air whose partial pressure of water vapor is low. In the fuel cell system according to this invention, condensation of moisture on the water-holding membrane is actively promoted due to a large temperature difference between the cathode exhaust and the fresh air. Consequently, moisture can effectively be transferred to the fresh air from the cathode exhaust.

Figure 4:
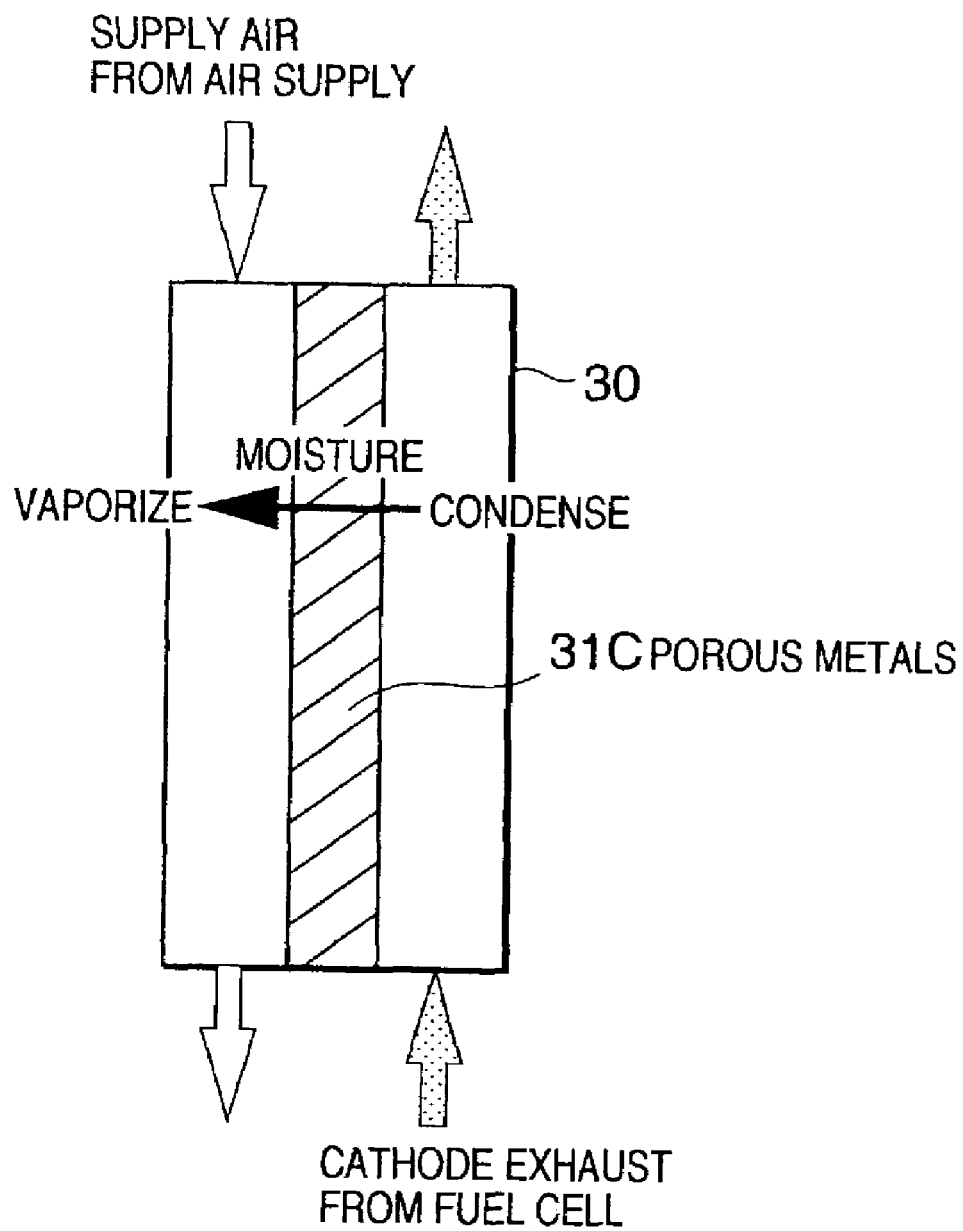
FIG. 4 is a schematic diagram of a moisture exchanger comprising a porous metal.

The moisture exchanger 30 shown in FIG. 4 comprises a porous metal plate 31C that separates the fresh air and the cathode exhaust. The cathode exhaust is cooled by using a large temperature difference between the cathode exhaust and the fresh air, and moisture in the cathode exhaust condenses on the surface of the porous metal plate 31C in the cathode exhaust side. Since the pressure of cathode exhaust is much higher than that of the fresh air, condensed water on the surface of the porous metal plate 31C in the cathode exhaust side is pushed into the fresh air side through holes in the porous metal plate 31C. The water vaporizes into the fresh air from the surface of the porous metal plate 31C in the fresh air side. Consequently, moisture can effectively be transferred to the fresh air from the cathode exhaust.

Figure 5:
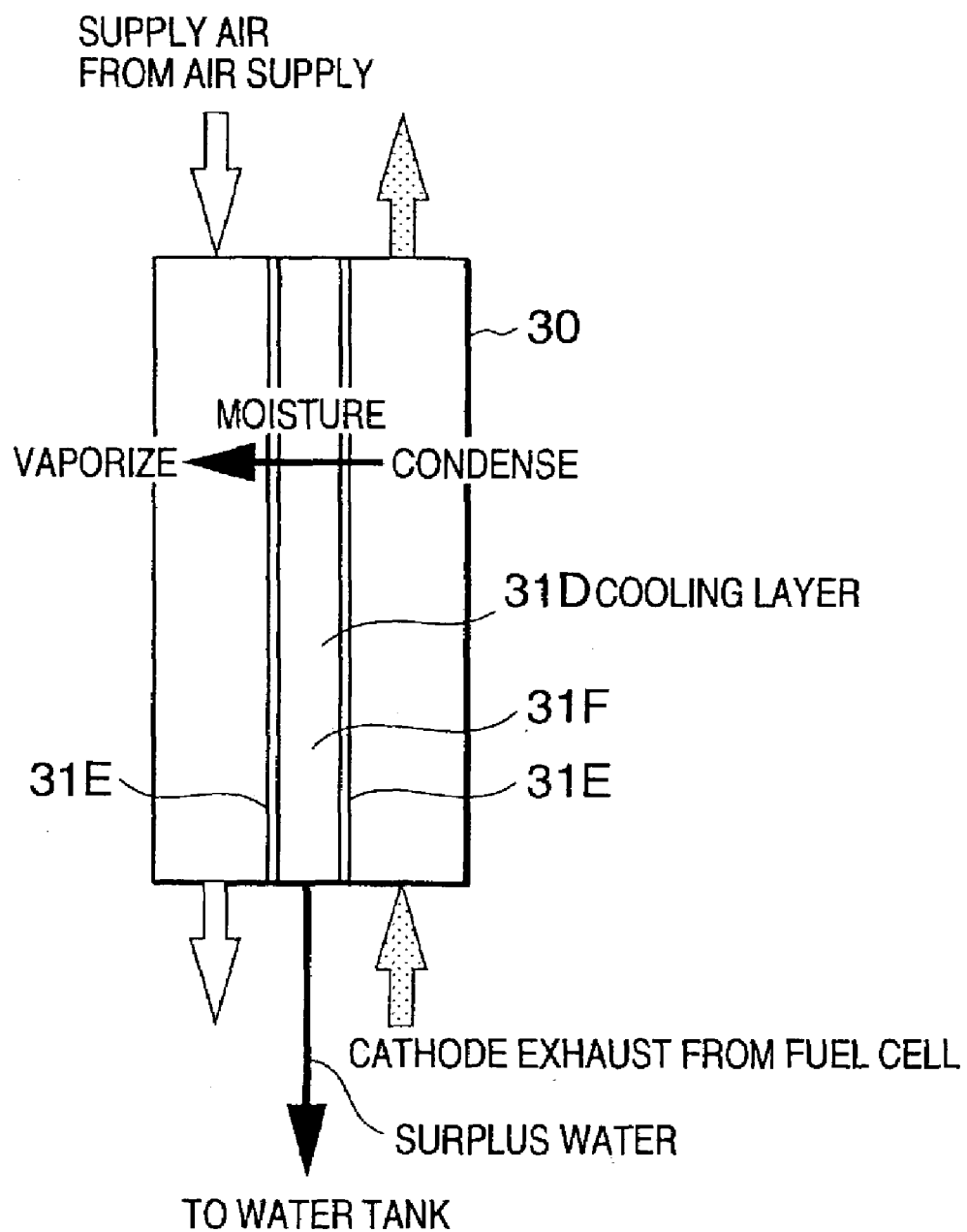
FIG. 5 is a schematic diagram of a moisture exchanger comprising a cooling layer.

The moisture exchanger 30 shown in FIG. 5 comprises a cooling layer 31D that separates the fresh air and the cathode exhaust. The cooling layer 31D comprises a pair of diaphragms 31E that pass only moisture and separate a cooling water passage 31F from the cathode exhaust and the fresh air. Condensed water from the cathode exhaust permeates the diaphragm 31E and reaches to the cooling water passage 31F. In contrast, a portion of water flowing through the cooling water passage 31F permeates the diaphragm 31E and vaporizes into the fresh air. The cooling water passage 31F is connected to the water tank 81. The water tank 81 collects excess water that is not vaporized via the cooling water passage 31F. To increase the capacity to cool the cathode exhaust, further cooled cooling water can be used to cool the cathode exhaust.

Next, a water balance of this fuel cell system will be discussed.

A fuel cell system that does not recover moisture from the cathode and/or anode exhaust and does not receive makeup water from outside the system has a following relationship.

Amount of water that fuel cell system generates>Amount of water that fuel cell system loses In the expression above, the amount of water that the fuel cell system generates denotes a total amount of the water A contained in the intake fresh air and the water B produced by the reaction in the fuel cell stack 2. The amount of water that the fuel cell system loses denotes a total amount of the water C used for reforming, the water D in the cathode exhaust that is discharged into the atmosphere in the form of the combustion gas, and the water E in the anode exhaust that is discharged into the atmosphere in the form of the combustion gas.

The water balance is generally expressed by the following expression using the above term A–E.

$$A+B>C+D+E$$

or alternatively, $$A+B-(C+D+E)>0$$

However, if the hydrogen rich gas and the fresh air are humidified, the water used for this humidification is finally discharged into the atmosphere in the form of the combustion gas. Thus, the water balance may follow the relationship below.

$$A+B-(C+D+E)<0$$

If this condition continues, the fuel cell system cannot keep its operation due to a water shortage in the fuel cell system. To avoid the water shortage, at least one of the condenser 60 or the condenser 62 is necessary to collect the water from the anode exhaust or the cathode exhaust respectively. If such a condenser is provided, the water discharged into the atmosphere decreases, and the fuel cell system can maintain the relationship above.

If the fuel cell system is used in a vehicle, for example, the size of the condensers 60 and 62 are limited by an available space of the vehicle. For example, if a radiator on the vehicle is used to cool cooling water, a limited size of radiator and a limited cooling air passing through the radiator limits the cooling capacity of the radiator. For this reason, depending on the operating conditions, the condenser 60 or 62 cannot cool cathode exhaust or the anode exhaust to the temperatures required to recover enough water to maintain the operation.

In this fuel cell system, moisture exchanger 30 assists the condenser 60 or 62 in recovering moisture from the cathode exhaust to humidify the fresh air. Consequently, the system can retain enough water to keep the operation regardless of the amount of water recovered in the condenser 60 or 62.

Next, the water balances of a fuel cell system comprising the moisture exchanger 30 and the water balance of a fuel cell system not comprising the moisture exchanger 30 are compared.

Suppose a fuel cell system that does not comprise the moisture exchanger 30 and must cool the cathode exhaust to 52° C. or below at the exit of the condenser 60 for the fuel system operation. By applying the moisture exchanger 30 capable of making the fresh air of the temperature of 50° C. and the relative humidity of 50% to the fuel cell system above, this fuel cell system can maintain its operation by cooling the cathode exhaust to 62° C. in the condenser 60. In other words, the cooling water of the condenser 60 can be set 10° C. higher by applying the moisture exchanger 30. If the cooling water is cooled by a radiator with the heat dissipation rate of 0.3 kW/K·m², the heat dissipation rate per unit area is increased by 3 kW/m² since the temperature difference between the cooling water and the outside air increases by 10° C. Thus, the efficiency of the radiator increases, and the radiator can be downsized.

Figure 6:
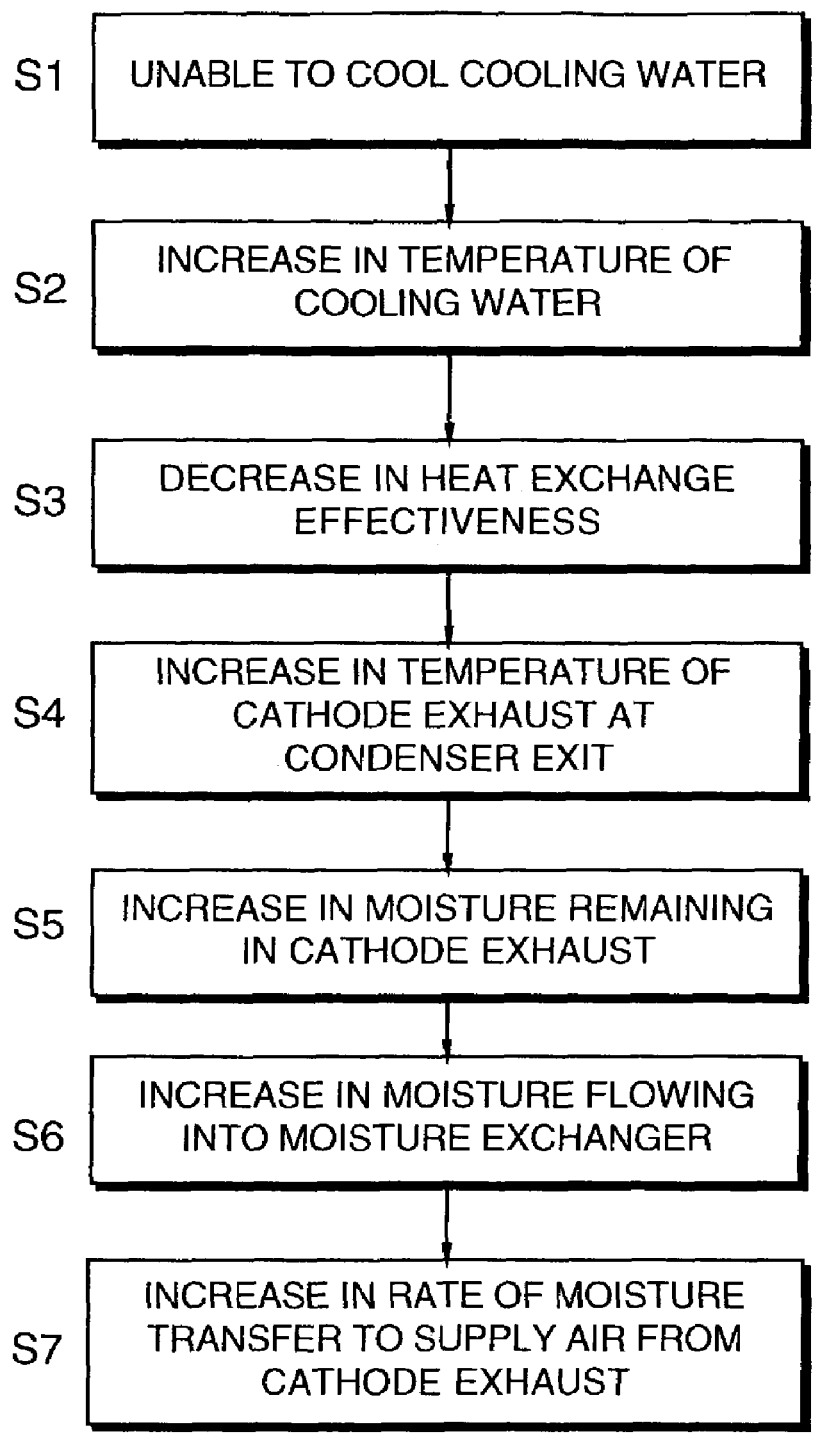
FIG. 6 is a flowchart describing a behavior of the fuel cell system when the temperature of cooling water goes up.

Referring to FIG. 6, how the fuel cell system according to this invention responds to a rise in temperature of the cooling water. The cooling water of the condenser 60 cannot be sufficiently cooled for some reason in a step S1, and the temperature of the cooling water increases in a step S2. In a step S3, the heat exchange rate of the condenser 60 decreases because the temperature of cooling water goes up. In a step S4, the outlet temperature of cathode exhaust from the condenser 60 increases. In a step S5, the condensation of moisture in the cathode exhaust decreases since the heat exchange rate of the condenser 60 decreases. Consequently, the amount of moisture in the cathode exhaust at the outlet of the condenser 60 increases. In a step S6, the amount of moisture in the cathode exhaust entering the moisture exchanger 30 increases. In a step S7, the transfer rate of moisture in the moisture exchanger 30 is increased with increase in the amount of moisture in the cathode exhaust. As a result, the moisture exchanger 30 helps the condenser 60 that cannot sufficiently recover moisture to maintain the operation of the fuel cell system.

Figure 7:
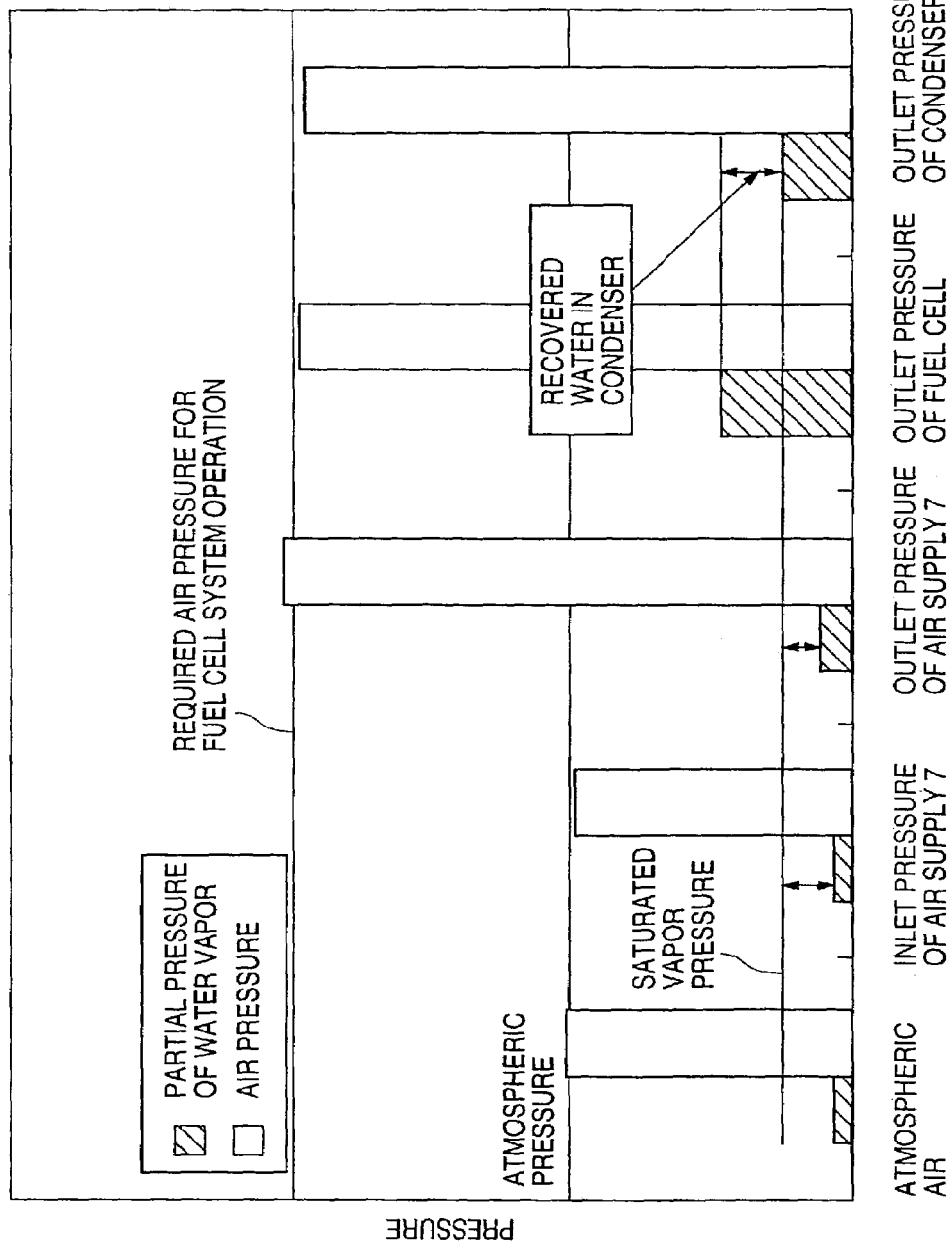
FIG. 7 is a graph describing changes in the partial pressures of water vapor of a fuel cell system without a moisture exchanger.

Referring to FIG. 7, the advantage of placing the moisture exchanger 30 in the suction side of the air supply device 7 is discussed.

FIG. 7 shows the changes in the pressure of the air and the partial pressure of water vapor in a fuel cell system not comprising a water exchanger 30. At the suction side of the air supply device 7, the pressure of fresh air drops to slightly below the atmospheric pressure. It is approximately equal to the suction pressure of the fan or the compressor comprising the air supply device 7. The partial pressure of water vapor of the fresh air at the suction side of the air supply device 7 is substantially equal to that of the atmosphere. The pressure of air at the outlet of the air supply device 7 increases since the air supply device 7 compresses the fresh air to the operating pressure of the fuel cell stack 2. The partial pressure of water vapor increases with increase in the pressure of air.

The pressure of cathode exhaust at the outlet of the fuel cell stack 2 drops to below the outlet pressure of the air supply device 7 as a result of a pressure loss in the fuel cell stack 2.

In contrast, the partial pressure of water vapor in the cathode exhaust is much larger than that in the fresh air supplied to the fuel cell stack 7 since the moisture generated in the fuel cell stack 2 is discharged into the cathode exhaust.

At the outlet of the condenser 60, the pressure of cathode exhaust decreases due to the pressure loss in the condenser 60. In the condenser 60, the partial pressure of water vapor becomes equal to the saturated water vapor pressure. The condenser 60 collects condensed saturated water. Thus, at the outlet of the condenser 60, the partial pressure of water vapor is equal to the saturated water vapor pressure corresponding to the temperature of cathode exhaust.

In the fuel cell system comprising a moisture exchanger 30 according to this invention, the moisture exchanger 30 is placed in the suction side of the air supply device 7 and in the exit side of the condenser 60. In this fuel cell system, the partial pressure of water vapor and the pressure of fresh air entering the moisture exchanger 30 are equal to those of fresh air at the suction opening of the air supply device 7 as shown in FIG. 7. The partial pressure of water vapor and the pressure of the cathode exhaust entering the moisture exchanger 30 are equal to those of the cathode exhaust at the exit side of the condenser 60 as shown in FIG. 7. The differences between the pressures of air and the differences between the partial pressures of water vapor allow an efficient transfer of moisture from the cathode exhaust to the fresh air. For example, in a fuel cell system with the moisture exchanger 30 comprising the porous metal 31C, water condensed on the porous metal 31C can be effectively transferred into the fresh air since the pressure of cathode exhaust is higher than the pressure of fresh air.

Figure 8:
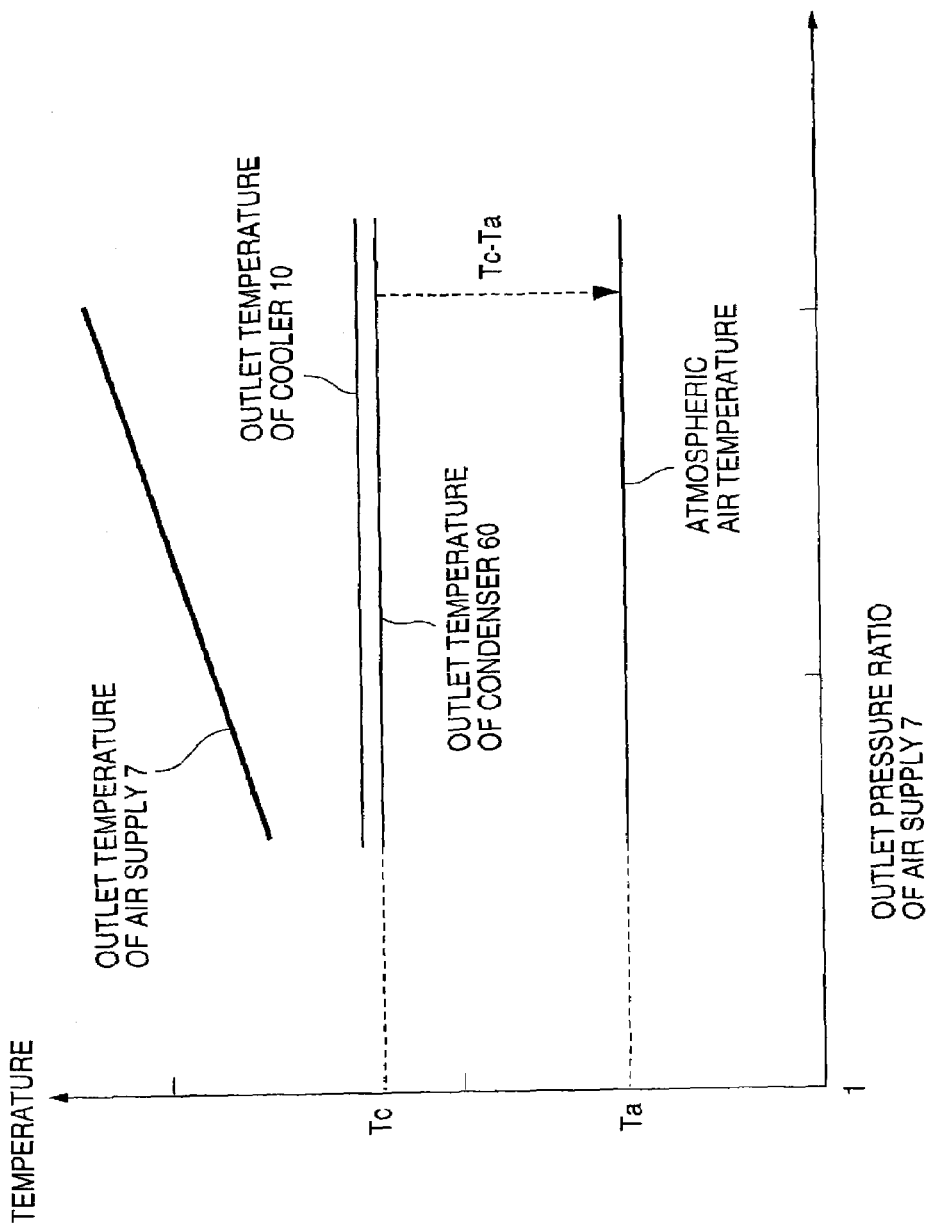
FIG. 8 is a graph describing changes in the temperatures of air in the fuel cell system according to this invention.

Referring to FIG. 8, in the fuel cell system according to this invention, the changes in the temperatures of the cathode exhaust and the fresh air entering the moisture exchanger 30 will be discussed. The outlet temperature of compressed fresh air from the air supply device 7 varies depending on the compression ratio. The cooler 10 cools the compressed fresh air to the predetermined temperature for an efficient operation of fuel cell stack 2.

The outlet temperature Tc of cathode exhaust from the condenser 60 in the FIG. 8 is equal to the temperature of the cathode exhaust entering the moisture exchanger 30. Also, the atmospheric temperature Ta in the FIG. 8 is equal to the temperature of the fresh air entering the moisture exchanger 30. Thus, Tc−Ta represents a temperature difference between the cathode exhaust and the fresh air in the moisture exchanger 30.

In the conventional fuel cell system disclosed in Tokkai 2000-156236, a moisture exchanger is placed in the exit side of an air supply device. Therefore, fresh air with a high temperature and a high pressure enters the fresh air side of the moisture exchanger. Since the atmospheric temperature and pressure are lower than those of the fresh air compressed by the air supply device, it is advantageous to place the moisture exchanger in the suction side of the air supply device 7 to promote the cathode exhaust cooling and the moisture exchange.

Figure 9:
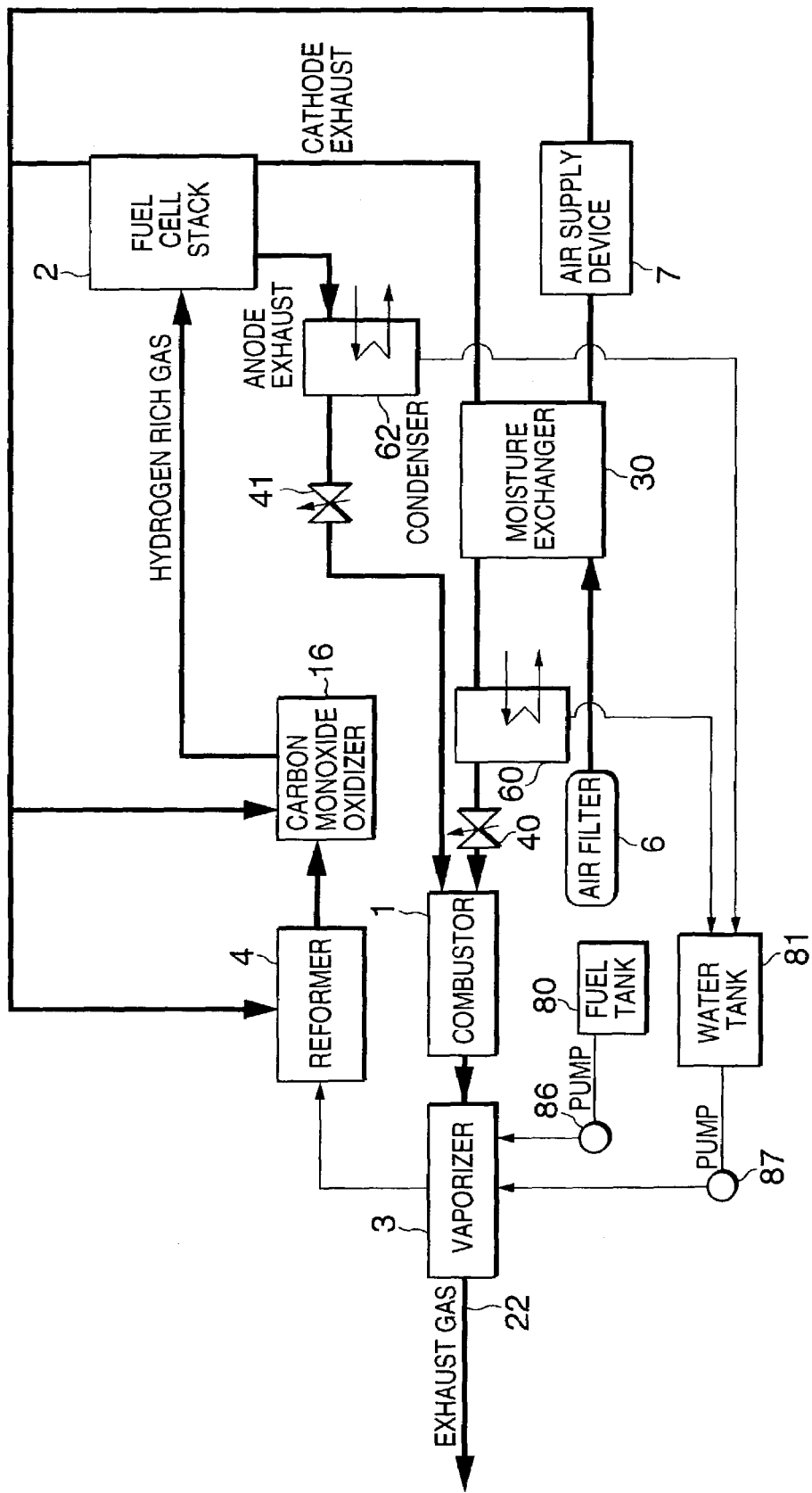
FIG. 9 is a schematic diagram of a fuel cell system according to a second embodiment of this invention.

Next, referring to FIG. 9, a second embodiment of this invention will be described.

According to this embodiment, the condenser 60 is placed in the exit side of the moisture exchanger 30. The arrangement of other apparatuses of the system is the same as in the first embodiment.

While the cathode exhaust cooled by the condenser 60 enters the moisture exchanger 30 in the first embodiment, the high temperature cathode exhaust discharged by the fuel cell stack 2 enters the moisture exchanger 30 in this embodiment. Therefore, the fresh air is heated to a higher temperature. If the pressure of fresh air is held constant, the saturated water vapor pressure increases with increase in the temperature of fresh air. For example, the saturated water vapor pressure at the temperature of 60° C. is approximately 0.199 bar while the saturated water vapor pressure at the temperature of 80° C. increases to approximately 0.474 bar. As a result, the water vapor that the fresh air can contain increases, and more moisture can be supplied to fresh air.

Furthermore, the moisture exchanger 30 reduces cooling load of the condenser 60 by cooling the cathode exhaust before entering the condenser 60. Consequently, the radiator to cool the cooling water of the condenser 60 can be downsized.

Figure 10:
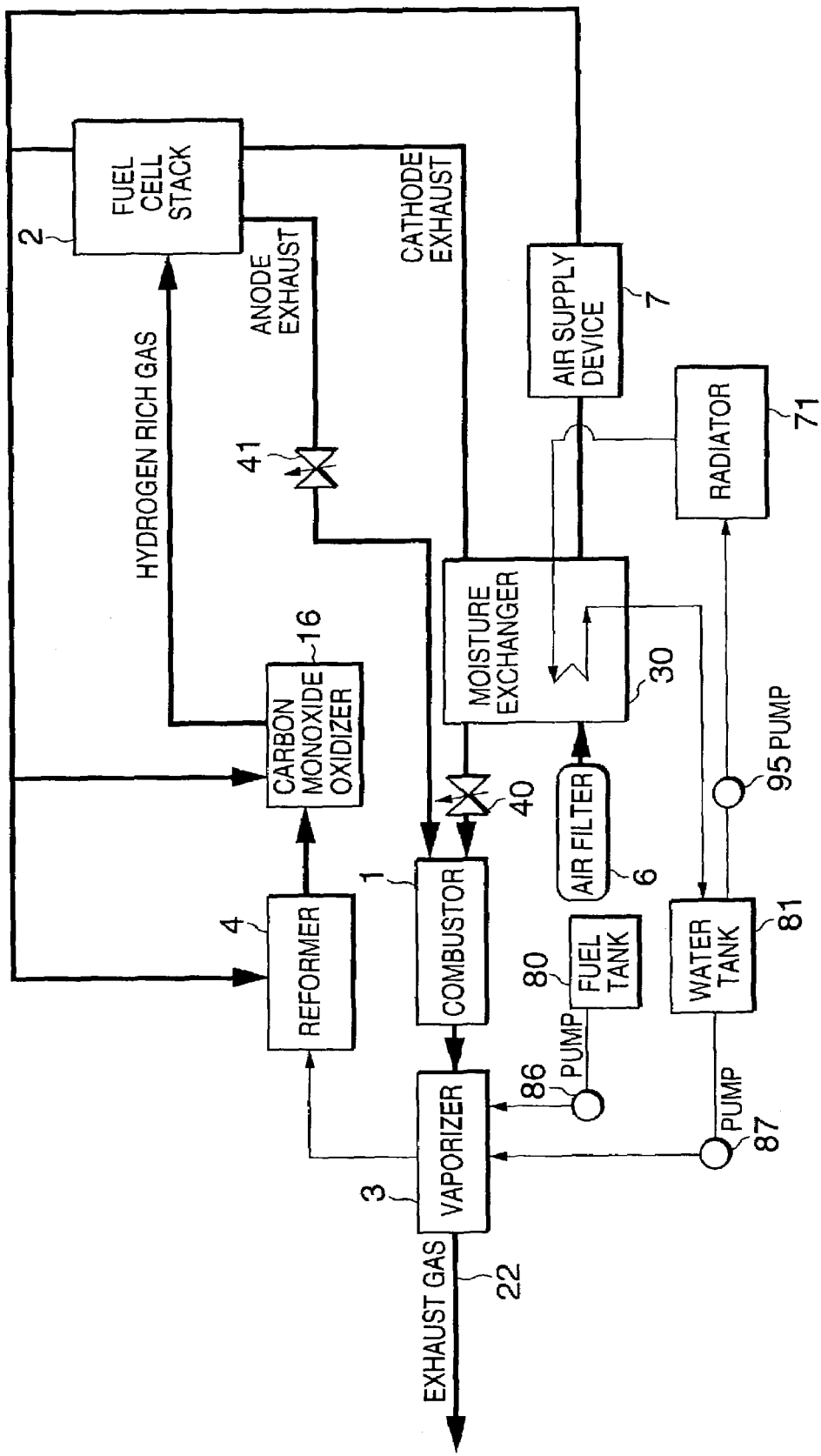
FIG. 10 is a schematic diagram of a fuel cell system according to a third embodiment of this invention.

Referring to FIG. 10, a third embodiment of this invention will be described.

According to this embodiment, the condenser 60 is omitted by using the moisture exchanger 30 comprising a cooling layer 31D shown in FIG. 5. A pump 95 pumps cooling water for the moisture exchanger 30 into a radiator 71 from the water tank 81. The cooling water cools the cathode exhaust in the moisture exchanger 30 after the cooling water is cooled by the radiator 71. Thereafter, the cooling water returns to the water tank 81. The arrangement of other apparatuses of the system is the same as in the first embodiment.

Omitting the condenser 60 realizes a small and lightweight fuel cell system. Furthermore, if the amount of moisture vaporized into the fresh air and the amount of moisture condensed from the cathode exhaust are not balanced, the water tank 81 supplies makeup water or collects excess water. Thus, the moisture exchanger 30 can remove moisture from the cathode exhaust regardless of the amount of water vaporized into the fresh air.

Figure 11:
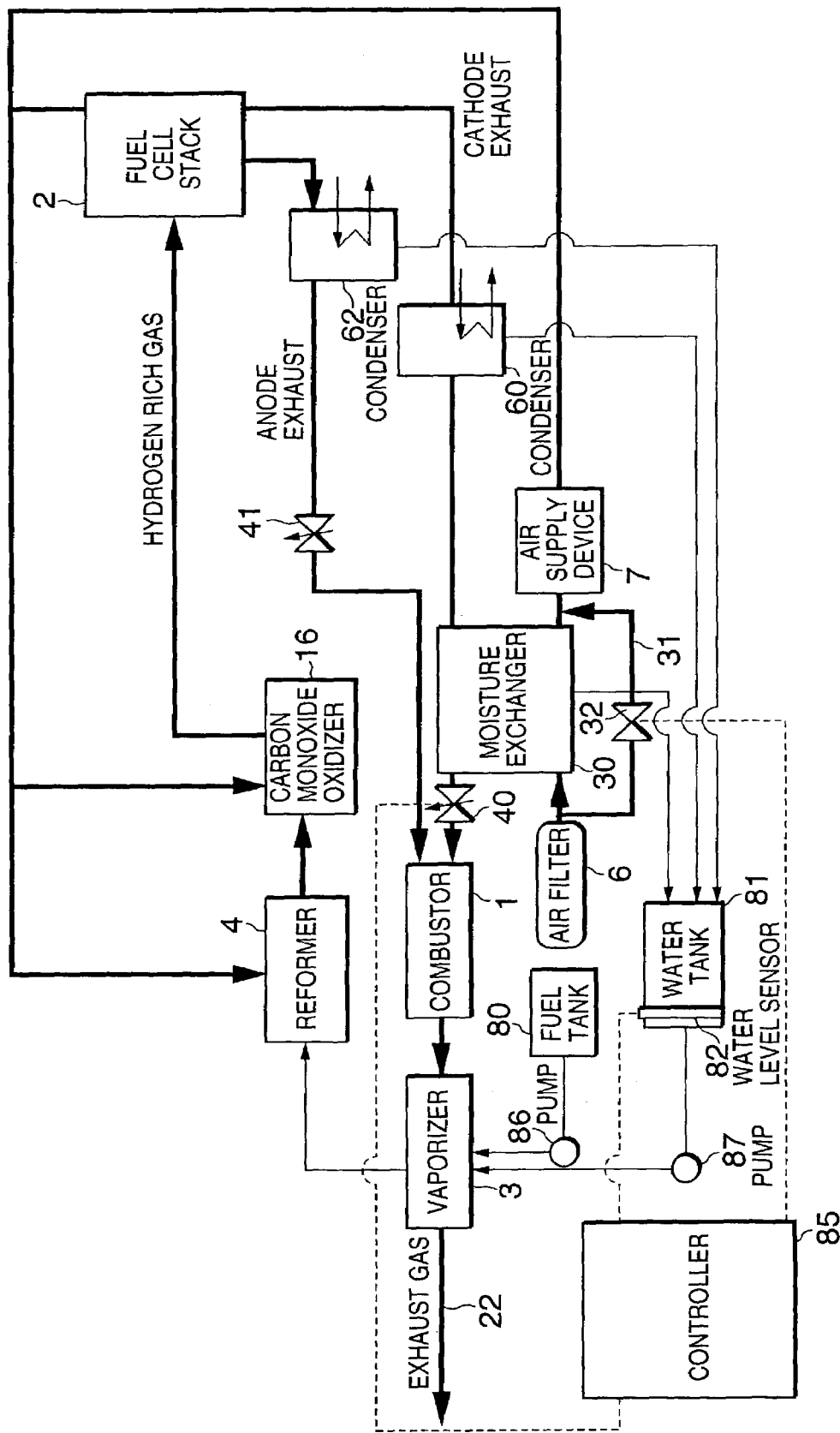
FIG. 11 is a schematic diagram of a fuel cell system according to a fourth embodiment of this invention.

Referring to FIG. 11, a fourth embodiment of this invention will be described. According to this embodiment, the fuel cell system comprises an air passage 31 that enables a portion of fresh air to bypasses the moisture exchanger 30. The passage 31 comprises a valve 32 that controls the flow rate of fresh air bypassing the moisture exchanger 30. The arrangement of other apparatuses of the system is the same as in the first embodiment.

By controlling the flow rate of fresh air bypassing the moisture exchanger 30, the controller 85 increases or decreases the flow of fresh air passing through the moisture exchanger 30. If the flow of fresh air entering the moisture exchanger 30 increases, the amount of the moisture transferred from the cathode exhaust to the fresh air increases. If the flow of fresh air entering the moisture exchanger 30 decreases, the amount of transferred moisture decreases.

Figure 12:
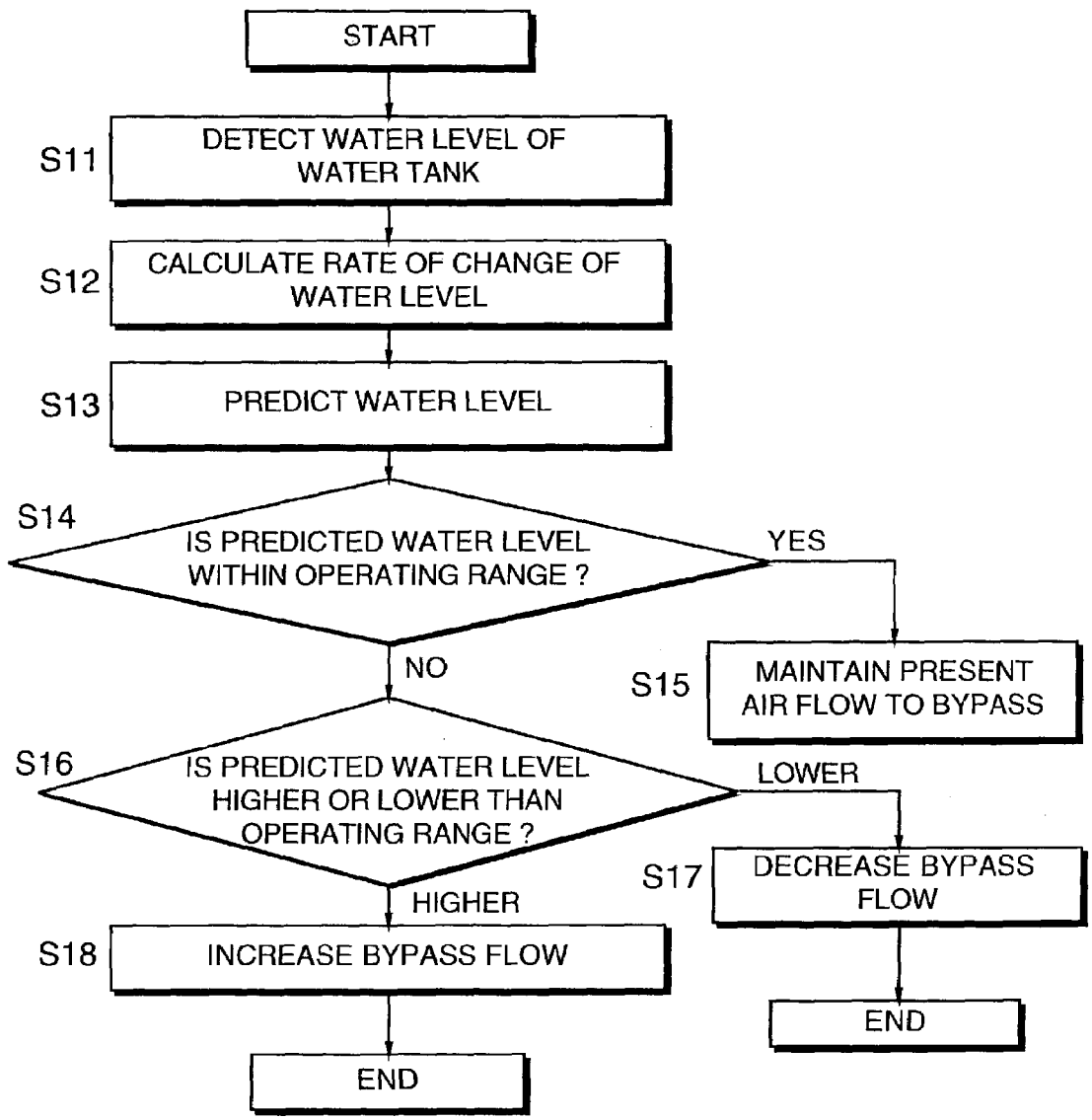
FIG. 12 is a flowchart describing a routine performed by the controller according to this invention to control an amount of moisture in the fuel cell system.

To perform the control above, the controller 85 determines the flow rate of bypassed fresh air by executing a routine shown in FIG. 12.

Referring to FIG. 12, in a step S11, the controller 85 reads a water level from the water level sensor 82 that detects the water level in the water tank 81.

In a step S12, the controller 85 computes the rate of change in the water level of the water tank 81 by comparing the present value of the water level with the previous value of the water level.

In a step S13, the controller 85 predicts the water level after a period based on the rate of change of the water level.

In a step S14, the controller 85 determines whether or not the predicted water level is in an operating water level range.

If the predicted water level is in the operating range, the controller 85 determines that the water supply and the water consumption in the fuel cell system are balanced, and the routine proceeds to a step S15.

In the step S15, the controller 85 maintains the current bypass flow. In contrast, if the predicted water level is out of the operating range, the routine proceeds to a step S16.

In the step S16, the controller 85 determines if the predicted water level is higher or lower than the operating range. If the predicted water level is lower than the operating range, the controller 85 determines that the system will be facing a water shortage, and the routine proceeds to a step S17. If the predicted water level is higher than the operating range, the controller 85 determines that the system will be facing an overflow of water, and the routine proceeds to a step S18.

In the step S17, the controller 85 decreases the degree of opening of the valve 32 to decrease the bypass flow and to increase the flow of the fresh air entering the moisture exchanger 30. This process increases the amount of water transferred from the cathode exhaust to the fresh air in the moisture exchanger 30 and prevents the system from being the water shortage.

In the step S18, the controller 85 increases the degree of opening of the valve 32 to increase the bypass flow and to decrease the flow of fresh air entering the moisture exchanger 30. This process decreases the amount of water transferred from the cathode exhaust to the fresh air in the moisture exchanger 30 to increase moisture discharged out of the system and prevents the system from the overflow of water. Furthermore, increasing the bypass flow can reduce the power consumption by the air supply device 7 since the pressure loss in the moisture exchanger 30 can be lowered.

This invention can be applied to a fuel cell system that directly supplies hydrogen gas to a fuel cell stack.

This invention can be applied to a fuel cell system not comprising a condenser 60 and/or a condenser 62.

The entire contents of Japanese Patent Application P2001-080122 (filed on Mar., 21, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The invention claimed is:

1. A fuel cell system, comprising:
    a fuel cell that produces electricity by producing a reaction between air and hydrogen rich gas and discharges cathode exhaust;
    an air supply device that compresses and supplies air to the fuel cell; and
    a moisture exchanger that extracts moisture from the cathode exhaust and supplies the moisture to the air before the air is compressed by the air supply device.

2. The fuel cell system as defined in claim 1, wherein the moisture exchanger comprises a porous metal that separates the air and the cathode exhaust.

3. The fuel cell system as defined in claim 1, wherein the moisture exchanger comprises a cooling water passage that is separated from the air and the cathode exhaust by a diaphragm.

4. The fuel cell system as defined in claim 3, the fuel cell system further comprises a water tank that is connected with the cooling water passage.

5. The fuel cell system as defined in claim 1, the fuel cell system further comprises a cooler that cools the compressed air and a water tank that collects water condensed in the cooler.

6. The fuel cell system as defined in claim 1, the fuel cell system further comprises a condenser that condenses and separates out moisture from the cathode exhaust discharged by the fuel cell.

7. The fuel cell system as defined in claim 1, the fuel cell system further comprises a condenser that further condenses and separates out moisture from the cathode exhaust from which a portion of moisture is already removed in the moisture exchanger.

8. The fuel cell system as defined in claim 1, the fuel cell system further comprises:
    a bypass passage that supplies air to the fuel cell by bypassing the moisture exchanger;
    a valve that increases or decreases an air flow rate through the bypass passage;
    a sensor that detects a water level in the water tank; and
    a programmable controller programmed to:
        compute a rate of change in the water level;
        compute a prospective water level based on the rate of change; and
        control the valve to increase or decrease the bypass flow rate based on the prospective water level.

\* \* \* \* \*